B. X. BLAIR.
Bag Fastening Apparatus.
No. 201,737.   Patented March 26, 1878.
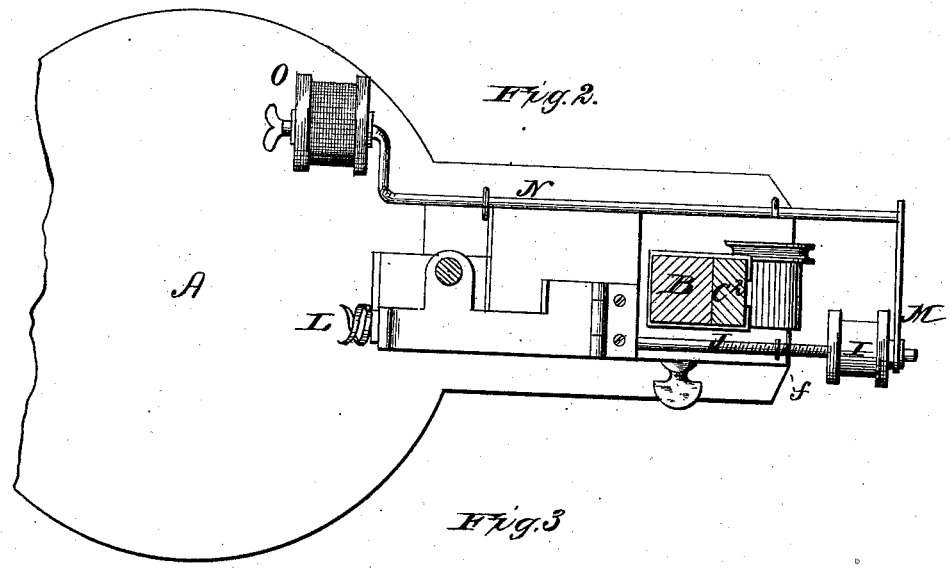
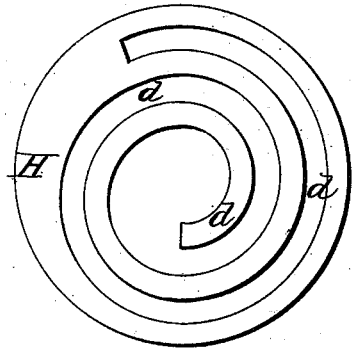
WITNESSES
F. L. Ouraud
C. L. Evert
INVENTOR
Brice X. Blair
Alexander & Mason
ATTORNEYS

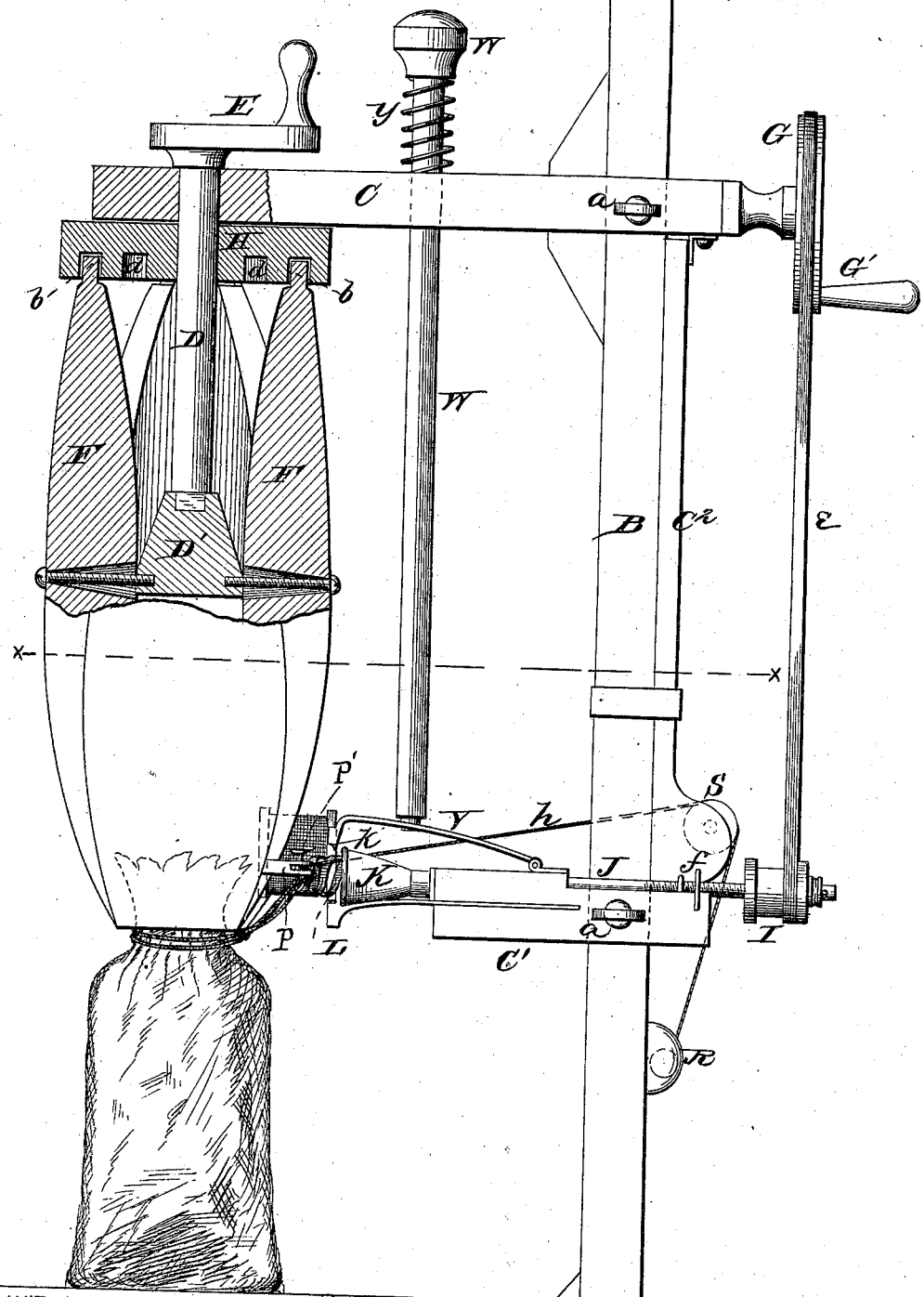

UNITED STATES PATENT OFFICE.

BRICE X. BLAIR, OF HUNTINGDON, PENNSYLVANIA.

IMPROVEMENT IN BAG-FASTENING APPARATUS.

Specification forming part of Letters Patent No. 201,737, dated March 26, 1878; application filed February 26, 1878.

*To all whom it may concern:*

Be it known that I, BRICE X. BLAIR, of Huntingdon, in the county of Huntingdon and State of Pennsylvania, have invented certain new and useful Improvements in Automatic Bag Crimper and Tiers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for tying sacks and bags, as will be hereinafter more fully set forth.

In order to enable others skilled in the art to which my invention appertains to make and use the same, I will now proceed to describe its construction and operation, referring to the annexed drawings, in which—

Figure 1 is a side elevation, partly in section, of my machine. Fig. 2 is a horizontal section through the line $x\,x$, Fig. 1. Fig. 3 is a detailed view of a part thereof.

A represents the base of the machine, from one end of which rises a standard, B. On this standard is a vertically-sliding frame, consisting of a top bar, C, bottom bar $C^1$, and vertical connecting-bar $C^2$, said frame being held on the standard at any height required by means of set-screws $a\,a$.

Through the outer end of the bar C is passed a shaft, D, provided with a crank, E, at its upper end. On this shaft, below the bar C, is secured a hub, D', of pyramidal form, and to each side of this hub is pivoted an upright clamping-jaw, F. The upper end of each jaw F is formed with a tenon, $b$, which works in a worm-groove, $d$, formed in the under side of a disk, H, attached to or formed on the under side of the bar C, and through the center of which the shaft D passes.

Upon the inner end of the bar C is a stud, which carries a band-wheel, G, provided with a crank, G', and this wheel is, by a band, $e$, connected with a pulley, I, which is secured upon a screw-shaft, J. This screw-shaft passes through a nut, $f$, at the rear end of the bar $C^1$ and extends to the front end thereof, and has a twister, L, secured to it, which lies within a stationary sleeve, K.

On the rear end of the screw J is an arm, M, which carries a rod, N, along the other side of the bar $C^1$, said rod N projecting beyond the said bar and carrying upon its end a spool, O, for fine wire. From one of the jaws F, near the lower end, projects a clamp, P, with set-screw P', as shown.

The frame $C\,C^1\,C^2$, with its attachments, as described, is adjusted at such a height upon the standard B that the lower ends of the jaws F can grasp the mouth of a bag or sack placed on the base A under them. These jaws are opened by turning the crank E in one direction, the tenons $b$ working inward in the worm-groove $d$.

R represents the spool for the cord $h$, which cord is carried over a tension, S, and its end fastened in the clamp P. By now turning the crank E so that the upper ends of the jaws F will move outward in the groove $d$, their lower ends will close and clamp the mouth of the bag, and at the same time carrying the cord $h$ twice around the mouth of the bag. When this is completed, by means of the wheel G the screw-shaft J is run forward, carrying the rod N and spool O with it, until the prongs of the twister can reach the crossed cord $h$. The wire from the spool O is then drawn to the twister, and by reversing the motion of the wheel G the twister will take hold of the wire and both ends of the cord, and as it recedes it will twist said wire and cord tightly together. When the twister has retired entirely within its sleeve K the wire and cord are cut off by means of a knife, $k$. This knife is attached to a hinged plate, V, from which a rod, W, extends up through the bar C, and the upper end of the rod is provided with a knob or head, W', between which and the bar C is a spiral spring, Y. By simply striking a blow on the head W' the knife $k$ is forced down to cut the wire and cord, and at the same time the wire and cord will be flattened, so as to prevent any liability of its coming loose.

Having thus fully described my invention, what I claim as new, and desire to secure by Letters Patent, is—

1. The clamping-jaws F F, pivoted to the sides of a pyramidal hub, D', and opened and closed by the tenons $b\,b$ on their upper ends working in a worm-groove, $d$, substantially as herein set forth.

2. The combination of the shaft D with crank E and pyramidal hub D′, the pivoted jaws F F, having tenons $b\,b$ at their upper ends, the clamp P, and the disk H, with worm-groove $d$, substantially as and for the purposes herein set forth.

3. The combination of the screw-shaft J with arms M and rod N, carrying the spool O, the nut $f$, and the twister L, substantially as and for the purposes herein set forth.

4. The combination of the spring-rod W, having hinged plate V and knife $k$, with the twisting device L and K, substantially as and for the purposes herein set forth.

In testimony that I claim the foregoing as my own I affix my signature in presence of two witnesses.

BRICE X. BLAIR.

Witnesses:
  FRANK GALT,
  F. L. OURAND.